//

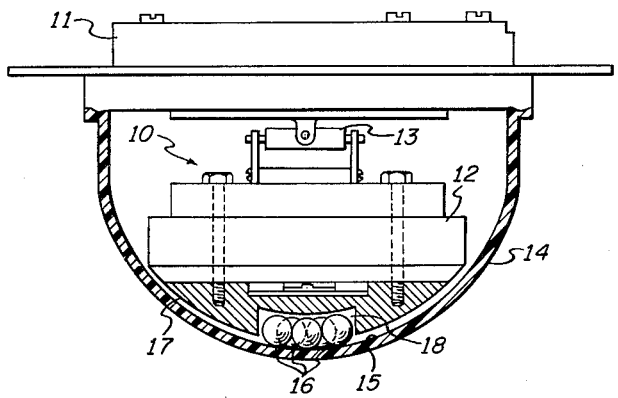
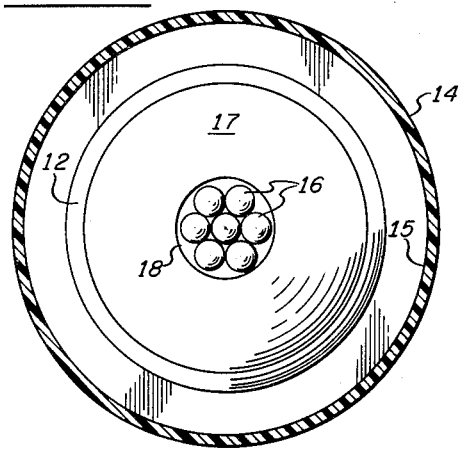
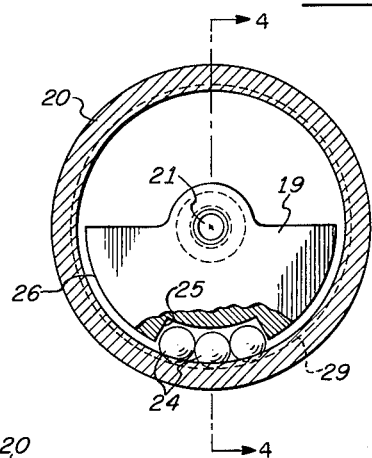
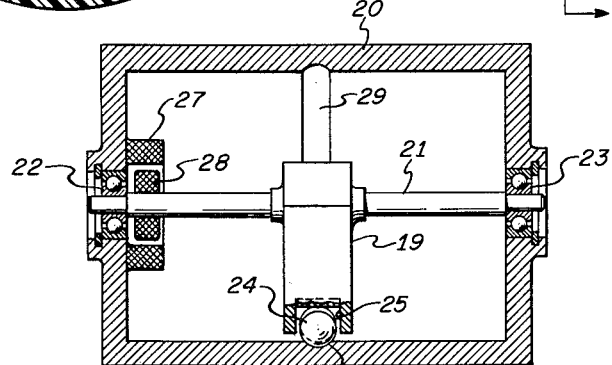
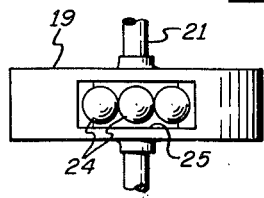

United States Patent Office 3,020,980
Patented Feb. 13, 1962

3,020,980
MECHANICAL DAMPING APPARATUS FOR A PENDENT MEMBER
Donald H. Baker and Donald J. Kesselring, Phoenix, Ariz., assignors to Sperry Rand Corporation, Great Neck, N.Y., a corporation of Delaware
Filed Mar. 13, 1961, Ser. No. 95,279
10 Claims. (Cl. 188—1)

This invention relates to apparatus that provides mechanical damping for an oscillatory pendent member or mass. In the improved damper, kinetic energy is dissipated to obtain the desired result by the interaction between a plurality of free balls and between the balls and the wall of a recess provided in the member or mass. Close tolerances in the production of the improved damper are not required as is the case in pneumatic and friction types of dampers. The characteristics of the ball dampers do not vary with temperature to the extent found in hydraulic dampers. Also, as the parts are not frictionally engaged, the ball damper is free of hang-off error as found in the other types of fluidless dampers.

An object of the present invention is to provide damping for an oscillatory member or mass that is supported pendulously without inducing hang-off error.

A feature of the invention resides in the utilization in a mechanical damper of the character described of a plurality of free balls on a curved track whose freedom is confined to close relative limits with relation to the pendent member being damped.

Further objects, advantages, features and structural details of the improved apparatus will be apparent from the following description when read in relation to the accompanying drawing, wherein, FIG. 1 is a side elevational view partly in vertical section showing an embodiment of the improved apparatus in which the pendent member or mass is universally supported in a frame;

FIG. 2 is a bottom view of the apparatus shown in FIG. 1 with the frame in section showing the location of the plurality of free balls within the recess provided in the member when the balls and member are statically conditioned and subject to the influence of gravitational acceleration only;

FIG. 3 is a side elevational view partly in vertical section showing an embodiment of the improved damper where the pendent member or mass is carried by the frame for movement about a single axis;

FIG. 4 is a sectional view taken on line 4—4 in FIG. 3; and

FIG. 5 is a bottom view similar to FIG. 2 showing the location of the free balls within the recess provided in the pendent member of the apparatus shown in FIGS. 3 and 4.

In the embodiment of the invention shown in FIGS. 1 and 2, the damping apparatus shown includes an oscillatory member or mass 10 that is supported pendulously in a frame 11. As shown, the mass element 10 of the combination includes a flux valve sensitive element 12 that is carried by the frame 11 through a gimbal ring connection 13 for universal movement about mutually perpendicular, normally horizontal, axes. The flux valve sensitive element 12 is accordingly stabilized as a part of the pendent mass 10 with respect to the vertical. The mass or member 10 swings or oscillates about its gimbal support axes due to the resultant influence of gravitational and transverse acceleration thereon.

The frame 11 of the damper shown in FIGS. 1 and 2 provides a case for mounting the flux valve on the craft in which it is used. The frame 11 includes an undercarriage 14 with a curved concave surface in the form of a bowl 15 that provides a ball track. The plural number of balls required in the improved damper are shown in FIG. 2 in a stationary contacting condition at the bottom of the track. The balls as indicated at 16 are seven in number, in this instance. The balls 16 are preferably solid metal spheres of a material such as K-Monel. The balls 16 are free to roll on the track surface of the bowl 15 responsive to the resultant influence of gravitational and transverse acceleration thereon. In the absence of transverse acceleration, the balls seek the low position on the curved track surface with the result that the pendulous member 10 hangs vertically with no hang-off error.

The oscillatory member or mass 10 of the combination has a convex undersurface 17 with a recess 18 therein of a wall configuration conforming to that of the balls 16 as a collection of contacting balls on the track that confines the freedom of the balls with relation to one another and with relation to the member to close relative limits. As shown in FIG. 2, the recess 18 provided in the undersurface 17 of member 10 is an opening of circular cross section. The wall of circular recess 18 is equidistantly spaced from the edges of the six adjacent balls 16 to confine the freedom of the balls to close relative limits with respect to the member 10.

In the embodiment of the invention shown in FIGS. 3, 4 and 5, a pendent mass 19 is carried by a closed end cylindrical frame 20 for movement about a single axis by means of a shaft 21 and spaced bearings 22, 23. The ball track 29 is formed by the curvature of the inside surface of the cylindrical frame 20 and by a groove that is shown extending around the circumference of the frame. The balls 24 utilized in this form of the invention are three in number as indicated in FIGS. 3 and 5. As shown in FIG. 5, the recess 25 formed in the convex undersurface 26 of the mass 19 is a closed end channel of rectangular cross section whose walls confine the freedom of the balls with relation to one another and with relation to the member to close relative limits. Where the balls are stationary and contacting as shown in FIG. 5, the end walls of the channel recess 25 are equidistantly spaced from the edges of the two adjacent balls 24 to confine the freedom of the balls to close relative limits with respect to the mass 19. The structure shown in FIGS. 3 and 4 provides a tilt detector where the frame 20 is fixed to a body capable of tilting about the axis of the shaft 21 and a suitable electrical pick-off such as a selsyn is included whose stator 27 is fixed to the frame and whose rotor 28 is fixed to the shaft as indicated in FIG. 4.

In the performance of the damping function accomplished mechanically in the improved apparatus, the balls roll on the provided track surface responsive to the resultant influence of gravitational and transverse acceleration thereon to dissipate the oscillations of the mass kinetically by the interaction between the rolloing balls and between the rolling balls and the confining wall of the recess provided in the mass.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:
1. Apparatus including a frame having a curved surface providing a ball track, a plurality of free balls that roll on the track surface responsive to the resultant influence of gravitational and transverse acceleration thereon, and an oscillatory member supported pendulously on the frame having a convex undersurface with a recess therein of a wall configuration conforming to that of the balls as a collection of contacting balls on the track that confines the freedom of the balls with relation to one another and with relation to the member to close relative limits, said apparatus providing mechanical damping for the oscillations of the member by the interaction between the rolling balls and between the rolling balls and the confining wall of the recess in the member.

2. Apparatus as claimed in claim 1, in which the member is supported on the frame for movement about a single axis, and the recess in the member is a closed end channel of rectangular cross section.

3. Apparatus as claimed in claim 1, in which the member is universally supported on the frame, and the recess in the member is an opening of circular cross section.

4. Apparatus including a frame having a curved concave surface providing a ball track, a plurality of free balls that roll on the track surface responsive to the resultant influence of gravitational and transverse acceleration thereon, and an oscillatory member supported pendulously on the frame having a convex undersurface with a recess thereon in the form of a closed end channel of rectangular cross section whose walls confine the freedom of the balls with relation to one another and with relation to the member to close relative limits, said apparatus providing mechanical damping for the oscillations of the member by the interaction between the rolling balls and between the rolling balls and the confining walls of the channel in the member.

5. Apparatus including a frame having a curved bowl surface providing a ball track, a plurality of free balls that roll on the track surface responsive to the resultant influence of gravitational and transverse acceleration thereon, and an oscillatory member supported pendulously and universally on the frame having a convex undersurface with a recess therein in the form of an opening of circular cross section whose wall confines the freedom of the balls with relation to one another and with relation to the member to close relative limits, said apparatus providing mechanical damping for the oscillations of the member by the interaction between the rolling balls and between the rolling balls and the confining wall of the opening in the member.

6. A mechanical damper including a frame having a curved surface providing a ball track, a plurality of free balls that roll on the track responsive to the resultant influence of gravitational and transverse acceleration thereon, and a pendent mass carried by the frame having a convex undersurface with a recess therein of a wall configuration conforming to that of the balls as a collection of contacting balls on the track that confines the freedom of the balls with relation to one another and with relation to the mass to close relative limits.

7. A damper as claimed in claim 6, in which the mass is carried by the frame for movement about a single axis, and the recess in the mass is a closed end channel of rectangular cross section.

8. A damper as claimed in claim 6, in which the mass is carried by the frame for movement about mutually perpendicular normally horizontal axes, and the recess in the mass is an opening of circular cross section.

9. A mechanical damper including a frame having a curved concave surface providing a ball track, a plurality of free balls that roll on the track surface responsive to the resultant influence of gravitational and transverse acceleration therein, and a pendent mass carried by the frame having a convex undersurface with a recess therein in the form of a closed end channel of rectangular cross section whose walls confine the freedom of the balls with relation to one another and with relation to the mass to close relative limits.

10. A mechanical damper including a frame having a curved bowl surface providing a ball track, a plurality of free balls that roll on the track surface responsive to the resultant influence of gravitational and transverse acceleration therein, and a pendent mass carried by the frame having a convex undersurface with a recess therein in the form of an opening of circular cross section whose wall confines the freedom of the balls with relation to one another and with relation to the mass to close relative limits.

No references cited.